(No Model.)
R. M. HUNTER.
TRACTION AND BRAKE DEVICE FOR ELECTRIC RAILWAYS.
No. 443,677. Patented Dec. 30, 1890.
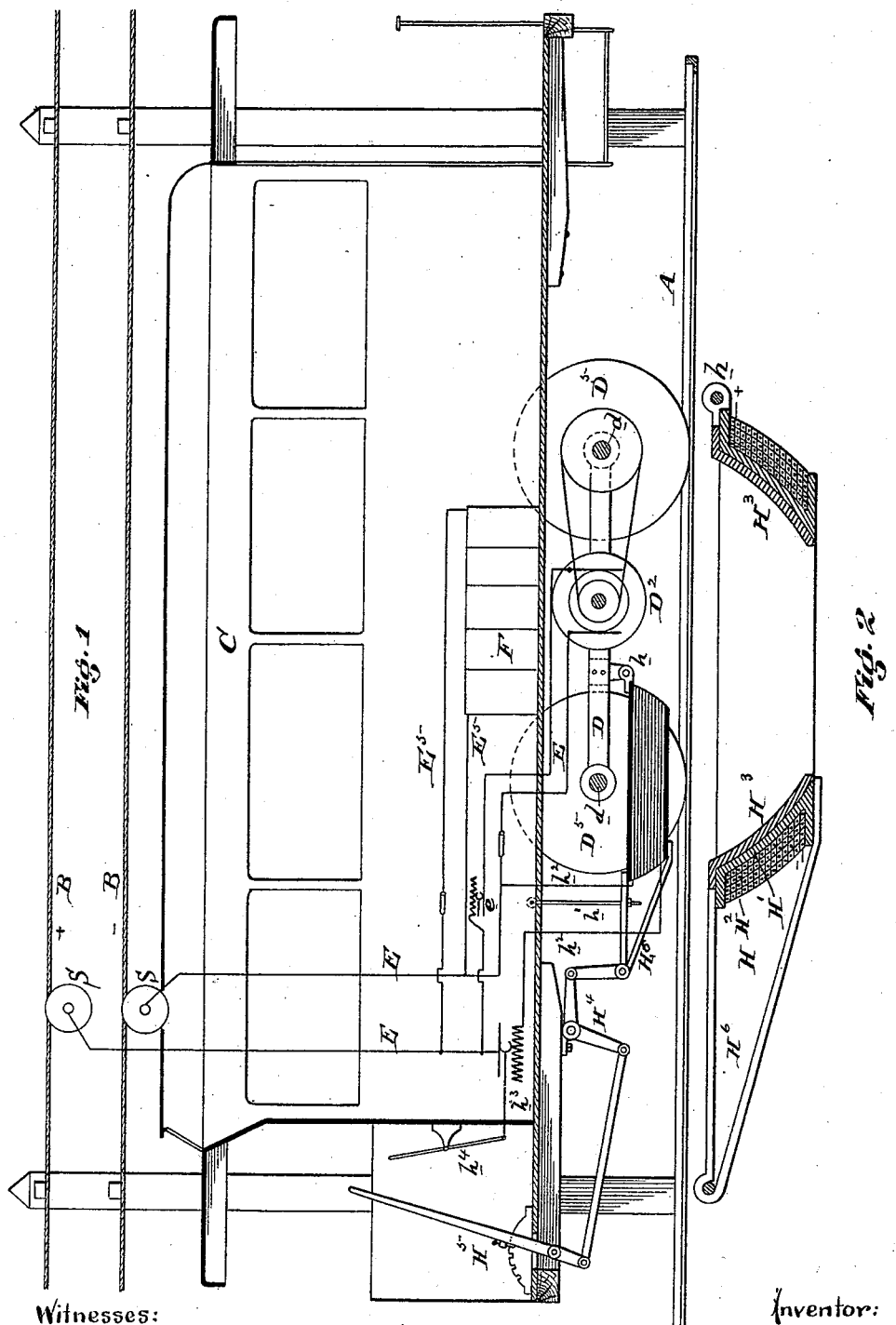
Witnesses:
Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

TRACTION AND BRAKE DEVICE FOR ELECTRIC RAILWAYS.

SPECIFICATION forming part of Letters Patent No. 443,677, dated December 30, 1890.

Original application filed September 23, 1886, Serial No. 214,309. Divided and application filed June 1, 1887, Serial No. 239,930. Again divided and this application filed July 2, 1890. Serial No. 357,477. (No model.)

*To all whom it may concern:*

Be it known that I, RUDOLPH M. HUNTER, of the city and county of Philadelphia, and State of Pennsylvania, have invented an Improvement in Traction and Brake Devices for Electric Railways, of which the following is a specification.

My invention has reference to traction and brake devices for electric railways; and it consists of certain improvements, which are fully set forth in the following specification and shown in the accompanying drawings, which form a part thereof.

This application (Case 150) is a division of my application, Serial No. 239,930, filed June 1, 1887, which is in turn a division of my application, Serial No. 214,309, filed September 23, 1886.

In various of my previous applications I have described different forms of electrical brakes and their application to electrically-propelled vehicles, and I have shown in this application a form of brake very similar to the traction-increasing device set out in my application, Serial No. 202,950, filed May 22, 1886.

Specifically the device consists of a helix upon a magnetizing-core, preferably hollow, and adapted to surround the lower part of the wheel. By sending a current through the coil the wheel is magnetized and attracts the rail, increasing the traction. If said hollow core be allowed to come into contact with the wheels, it acts as a brake. This movement is controlled by a suitable hand-lever, and when the brake is applied the traction force also increases, still further assisting in arresting the motion of the vehicle. Whether this device shall simply act as a traction-increaser or as a brake depends upon the movement of the lever. If the core does not touch the wheel, then the tendency to stop the train is not produced; but the instant the brake proper is applied then all of the electrical forces are utilized to arrest the rotation of the wheels. Removable brake-shoes may be used instead of the core to prevent wear of the permanent parts. The car or vehicle may be supplied with electricity from line-conductors extending along the railway or batteries carried upon or moving with the car, or both combined. The motor which propels the car is preferably coupled in multiple or parallel with respect to the brake and traction-increasing device. I provide means for varying the current flowing through the traction-increasing device, whereby its magnetizing-power may be varied to suit the requirements independent of the movement of the magnetizing-helix with respect to the wheel.

I do not limit myself to the details of construction herein set out, as they may be modified in various ways without departing from the spirit of the invention.

Referring to the drawings, Figure 1 represents a sectional side elevation of an electrically-propelled car embodying my invention, and Fig. 2 is a longitudinal section through one of the brake and traction-increasing helices.

A are the rails.

B B are two line-conductors, which may be suspended or otherwise arranged with respect to the railway and from which current may be taken by suitable current-collecting devices S S. If desired, the return-conductor may be the rails.

C is the car, to which the current-collecting devices are secured in any suitable or well-known manner. D is a frame carried upon the axles $d$ of the wheels $D^5$ and to which frame the electric motor $D^2$ is secured. Suitable gearing or power-transmitting devices connect the motor-shaft with the axle.

E are the motor-circuits on the car leading from the collectors S.

F is an electric battery, which may be of the primary or secondary type and connects with the motor-circuits E by conductors $E^5$. The batteries F may be carried on or move with the car, and may be used as the sole source of electric energy for operating the motor and brake, or may be used in connection with the line-conductors, if desired.

H is a traction-increaser and brake. It consists of a case or core H', made hollow and adapted to conform to the shape of the lower part of the traction-wheels $D^5$, and is provided on the inside with removable wearing brake-shoes $H^3$, which press upon the rim of the wheel. This core is preferably of magnetic metal or a metal capable of being magnetized, and is provided with a magnetizing-helix H². This brake surrounds the lower part of the wheel and is held clear of the rail. It is pivoted at $h$ to the frame D and has at its opposite end an arm H⁶, which, through levers and link H⁴, enables the brake to be moved by the hand-lever H⁵ to or from the wheel or pressed against it. The downward movement of this brake is limited by a link or bolt $h'$, having an adjustable supporting-nut at the bottom.

The helix H² is magnetized by the current passing through the brake-circuit $h^2$, derived from the motor-circuit E. This circuit is provided with a circuit-breaker and resistance-changer $h^3$, which may be operated by a hand-lever $h^4$ to apply and vary the power of the brake or tractive effort. By operating the lever H⁵ the device may be used as a mechanical brake, and if the circuit $h^2$ is closed it then also operates as an electric brake, since the core and its shoes are attracted tightly against the wheel. By closing the circuit and operating the levers H⁴ and H⁵ so that the brake-shoe does not touch the wheel the helix and its core will magnetize the wheel and cause it to attract the rail, thereby increasing its tractive force. This is also increased by the magnets formed by said helix and core attracting the rail directly.

In practice the motor would have its own regulating apparatus $e$, which may be operated independently of the controlling devices of the brake-magnet.

If the battery F be a secondary battery, it may be changed from the line-conductors when desired and utilized at other times for energizing the brake and operating the electric motor separately or in connection with the line-conductors. It may be used upon portions of the railway where there are no line-conductors, and may be used to convey the car to its destination and back to the beginning of the line-conductors again.

Having now described my invention, what I claim as new, and desire to secure by Letters Patent, is—

1. In an electric railway, the combination of a traveling vehicle, an electric motor thereon to propel the same, an electric brake consisting of a magnetizing coil or helix surrounding a portion of a wheel on the vehicle-shaft, a brake-circuit including said brake-helix, and means to vary the strength of the current.

2. In an electric railway, the combination of a traveling vehicle, an electric motor thereon to propel the same, an electric brake consisting of a magnetizing coil or helix surrounding a portion of a wheel on the vehicle-shaft, a brake-circuit including said brake-helix, means to vary the strength of the current, wearing portions or shoes carried by said brake-helix, and means to move said shoes to or from the wheel.

3. In an electric railway, the combination of a traveling vehicle, an electric motor thereon to propel the same, an electric brake consisting of a magnetizing coil or helix surrounding a portion of a wheel on the vehicle-shaft, and means to move said brake-helix to or from the center of the wheel.

4. In an electric railway, a suspended working-conductor, in combination with an electrically-propelled vehicle, an electric motor on said vehicle, a collecting device carried by said vehicle and making contact with said working-conductor above the car as it passes longitudinally beneath the same, a brake-helix surrounding the lower portion of a wheel of the vehicle, a brake-circuit on the car including said brake-helix, and means to vary the strength of the current carried by the car.

5. In an electric railway, an electrically-propelled vehicle, combined with an electric brake consisting of a helix inclosing a hollow magnetic case having its side walls parallel and its ends curved to fit over the vehicle-wheel, a circuit including said helix, and a source of electrical energy.

6. The combination, with an electrically-propelled vehicle, of an electric brake adapted to attract the vehicle-wheel, hand devices to move said brake nearer to or farther from said wheel, a source of electric energy, a brake-circuit, and a circuit-breaker in said circuit.

7. The combination, with an electrically-propelled vehicle, of an electric brake adapted to attract the vehicle-wheel, hand devices to move said brake nearer to or farther from said wheel, a source of electric energy, a brake-circuit, and a circuit-controller to increase or decrease the current flowing through the brake-circuit.

8. The combination, with an electrically-propelled vehicle, of an electric brake adapted to attract the vehicle-wheel, hand devices to move said brake nearer to or farther from said wheel, a source of electric energy, a brake-circuit, and a resistance-changer in said brake-circuit.

9. The combination, with an electrically-propelled vehicle, of an electric brake adapted to attract the vehicle-wheel, hand devices to move said brake nearer to or farther from said wheel, wearing-shoes attached to said brake, a source of electric energy, a brake-circuit, and a circuit-breaker in said circuit.

10. The combination, with an electrically-propelled vehicle, of an electric brake adapted to attract the vehicle-wheel, hand devices to move said brake nearer to or farther from said wheel, wearing-shoes attached to said brake, a stop to limit the movement of said brake away from the wheel, a source of electric energy, a brake-circuit, and a circuit-breaker in said brake-circuit.

11. The combination of an electrically-propelled vehicle, a source of electric energy, a magnetizing-helix arranged close to the track and surrounding the lower part of the vehicle-wheel, a magnetizing-core to said helix independent of the vehicle-wheel, an electric circuit including said helix, a circuit-controller, means to move said helix to or from the said rail, and a stop to prevent said helix touching the rails.

12. The combination, in an electric railway, of an electrically-propelled vehicle, a magnetizing-helix surrounding the lower part of the vehicle-wheel and arranged close to the rail, a magnetizable core for said helix, brake-shoes carried by said helix, a source of electric energy, an electric circuit including said helix, and means to raise or lower said helix, whereby it may act as a brake to arrest the travel of the vehicle or increase its traction force.

13. The combination, in an electric railway, of an electrically-propelled vehicle, a magnetizing-helix surrounding the lower part of the vehicle and arranged close to the rails, a magnetizable core for said helix, brake-shoes carried by said helix, a source of electric energy, an electric circuit including said helix, a circuit-controller in said circuit, and means to raise or lower said helix, whereby it may act as a brake to arrest the travel of the vehicle or act to increase its traction force.

14. The combination, in an electric railway, of an electrically-propelled vehicle, a magnetizing-helix surrounding the lower part of the vehicle-wheel and arranged close to the rails, a magnetizable core for said helix, brake-shoes carried by said helix, a source of electric energy, an electric circuit including said helix, a resistance-changer in said circuit, and means to raise or lower said helix, whereby it may act as a brake to arrest the travel of the vehicle or increase its traction force.

In testimony of which invention I have hereunto set my hand.

R. M. HUNTER.

Witnesses:
ERNEST HOWARD HUNTER,
MAURICE H. HOLMES.